United States Patent
Momoki

(10) Patent No.: US 10,534,193 B2
(45) Date of Patent: Jan. 14, 2020

(54) OPTICAL LOW PASS FILTER AND, IMAGE CAPTURING APPARATUS AND IMAGE CAPTURING UNIT HAVING THE SAME

(71) Applicant: CANON KABUSHIKI KAISHA, Tokyo (JP)

(72) Inventor: Kazuhiko Momoki, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 15/632,183

(22) Filed: Jun. 23, 2017

(65) Prior Publication Data
US 2018/0004003 A1 Jan. 4, 2018

(30) Foreign Application Priority Data
Jun. 30, 2016 (JP) ................................ 2016-130913

(51) Int. Cl.
G02B 27/28 (2006.01)
G02B 27/12 (2006.01)
H04N 5/225 (2006.01)

(52) U.S. Cl.
CPC ......... *G02B 27/288* (2013.01); *G02B 27/126* (2013.01); *H04N 5/2254* (2013.01)

(58) Field of Classification Search
CPC .... G02B 27/288; G02B 27/126; G02B 27/46; G02B 5/201
See application file for complete search history.

(56) References Cited

U.S. PATENT DOCUMENTS

| | | | |
|---|---|---|---|
| 5,781,236 A | 7/1998 | Shinbori et al. | |
| 6,144,493 A * | 11/2000 | Okuyama | G02B 26/06 250/201.9 |
| 2002/0158985 A1* | 10/2002 | Saitoh | G02B 7/006 348/340 |
| 2009/0169126 A1* | 7/2009 | Masuda | H01L 27/14621 382/255 |
| 2010/0201853 A1* | 8/2010 | Ishiga | H04N 5/2254 348/280 |

FOREIGN PATENT DOCUMENTS

JP H02100018 A 4/1990

* cited by examiner

*Primary Examiner* — William R Alexander
*Assistant Examiner* — Ephrem Z Mebrahtu
(74) *Attorney, Agent, or Firm* — Canon U.S.A., Inc. IP Division

(57) ABSTRACT

An optical low pass filter includes a first birefringent plate, a second birefringent plate, a third birefringent plate, and a fourth birefringent plate. A conditional expression of 1.15<b/a<3 is satisfied, in a case where a separation width of an incident light ray in each of the first birefringent plate and the second birefringent plate is set to be a and a separation width of an incident light ray in each of the third birefringent plate and the fourth birefringent plate is set to be b.

18 Claims, 13 Drawing Sheets

OPTICAL LOW PASS FILTER AND, IMAGE CAPTURING APPARATUS AND IMAGE CAPTURING UNIT HAVING THE SAME

BACKGROUND OF THE INVENTION

Field of the Invention

The disclosure relates to an optical low pass filter used for a digital camera and the like.

Description of the Related Art

It has been known that false color and moire are generated when an image having a high spatial frequency is captured by an image capturing apparatus such as a digital still camera or a digital video camera. In order to reduce such false color and moire, an optical low pass filter that reduces contrast of an image having a high spatial frequency is used.

Japanese Patent Laid-Open No. 2-100018 describes that, in an optical low pass filter formed by four birefringent plates, a separation width of a light ray in each of the birefringent plates is appropriately set, so that frequency characteristics that are uniform regardless of a direction is obtained.

However, when a direction (hereinafter, referred to as a vertical/horizontal direction) parallel to a long side or a short side of an image-capturing element is compared to a direction (hereinafter, referred to as a diagonal direction) that forms an angle of 45° to the short side of the image-capturing element, moire tends to easily become conspicuous in the case of the diagonal direction. This is because the moire in the diagonal direction appears as false color.

Thus, in a case where the optical low pass filter described in Japanese Patent Laid-Open No. 2-100018 is designed an the assumption that the moire in the vertical/horizontal direction is reduced, even if the moire generated in the vertical/horizontal direction is able to be reduced, false color due to the moire in the diagonal direction can be generated. On the other hand, when the optical low pass filter is designed on the assumption that the moire in the diagonal direction is reduced, even if the moire generated in the diagonal direction is able to be reduced, perceived resolution in the vertical/horizontal direction is excessively reduced. Accordingly, it is difficult for the optical low pass filter described in Japanese Patent Laid-Open No. 2-100018 to reduce occurrence of false color in the diagonal direction while keeping the perceived resolution in the vertical/horizontal direction.

SUMMARY OF THE INVENTION

The disclosure provides an optical low pass filter capable of reducing a cut-off frequency in a diagonal direction compared to a cut-off frequency in a vertical/horizontal direction.

An optical low pass filter according to the invention is arranged on a side of a light-receiving surface of an image-capturing element. The optical low pass filter includes: a first birefringent plate of which an orthogonal projection of an optic axis onto the light-receiving surface is parallel to a long side of the image-capturing element; a second birefringent plate of which an orthogonal projection of an optic axis onto the light-receiving surface is parallel to a short side of the image-capturing element; third birefringent plate of which an orthogonal projection of an optic axis onto the light-receiving surface forms an angle of 45° to the short side of the image-capturing element; and a fourth birefringent plate of which an orthogonal projection of an optic axis onto the light-receiving surface forms an angle of 90° to the orthogonal projection of the optic axis of the third birefringent plate onto the light-receiving surface, in which a conditional expression of $1.15<b/a<3$ is satisfied, in a case where a separation width of an incident light ray in each of the first birefringent plate and the second birefringent plate is set to be a and a separation width of an incident light ray in each of the third birefringent plate and the fourth birefringent plate is set to be b.

Another optical low pass filter according to the invention is arranged on a side of a light-receiving surface of an image-capturing element. The optical low pass filter includes: a first birefringent plate that separates an incident light ray in a first direction parallel to a long side of the image-capturing element; a second birefringent plate that separates an incident light ray in a second direction parallel to a short side of the image-capturing element; a third birefringent plate that separates an incident light ray in a third direction that forms an angle of 45° to the short side of the image-capturing element on the light-receiving surface; and a fourth birefringent plate that separates an incident light ray in a fourth direction that forms an angle of 90° to the third direction on the light-receiving surface, in which a conditional expression $1.15<b/a<3$ is satisfied, in a case where a separation width of an incident light ray in each of the first birefringent plate and the second birefringent plate is set to be a and a separation width of an incident light ray in each of the third birefringent plate and the fourth birefringent plate is set to be b.

Further features and aspects of the disclosure will become apparent from the following description of example embodiments with reference to the attached drawings.

DESCRIPTION OF THE EMBODIMENTS

Figure 1:
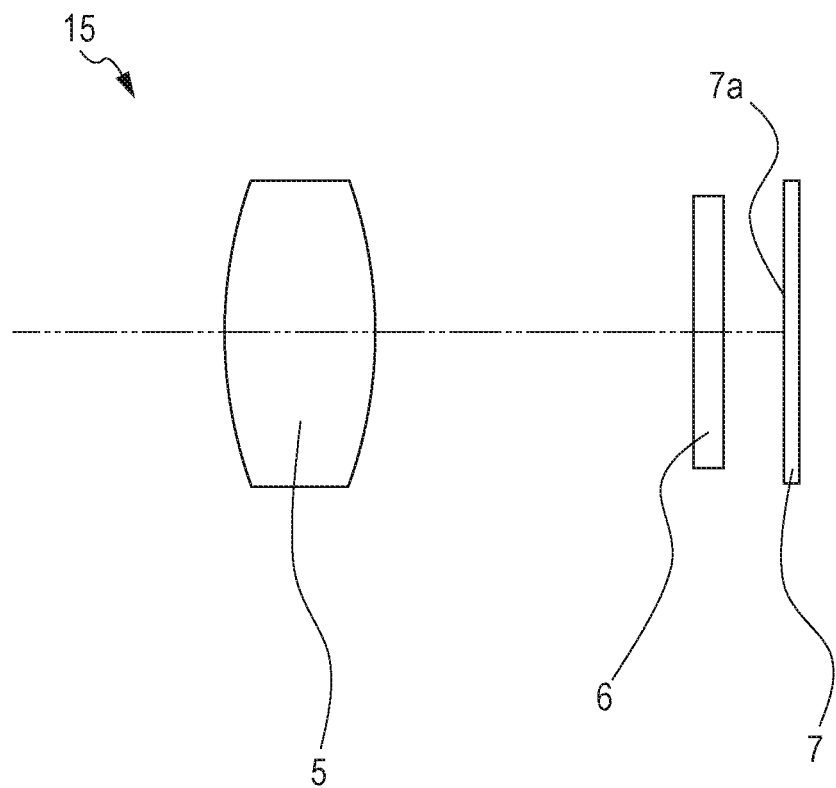
FIG. 1 is a cross-sectional view of a part of an image capturing apparatus having an optical low pass filter.

Hereinafter, various embodiments and features of the disclosure will be described with reference to drawings. In the drawings, the same reference signs are assigned to the same parts and duplicated description will be omitted.

Example Embodiment 1

FIG. 1 illustrates a partial cross section of an image capturing apparatus 15 including an optical low pass filter (hereinafter, referred to as a low pass filter) 6 of the present embodiment. The low pass filter 6 is arranged on a light-receiving surface side of an image-capturing element 7. Thus, light transmitted through an optical system 5 reaches a light-receiving surface 7a of the image-capturing element 7 through the low pass filter 6. The image capturing apparatus 15 illustrated in FIG. 1 is a digital still camera, a digital video camera, a smartphone, or the like.

The optical system 5 has at least one lens and forms an image on the light-receiving surface 7a of the image-capturing element 7. The image-capturing element 7 is a CMOS sensor or a CCD sensor and has a plurality of pixels. With the pixels of the image-capturing element 7, the light that has reached the light-receiving surface 7a is subjected to photoelectric conversion and image data is generated.

Figure 2:
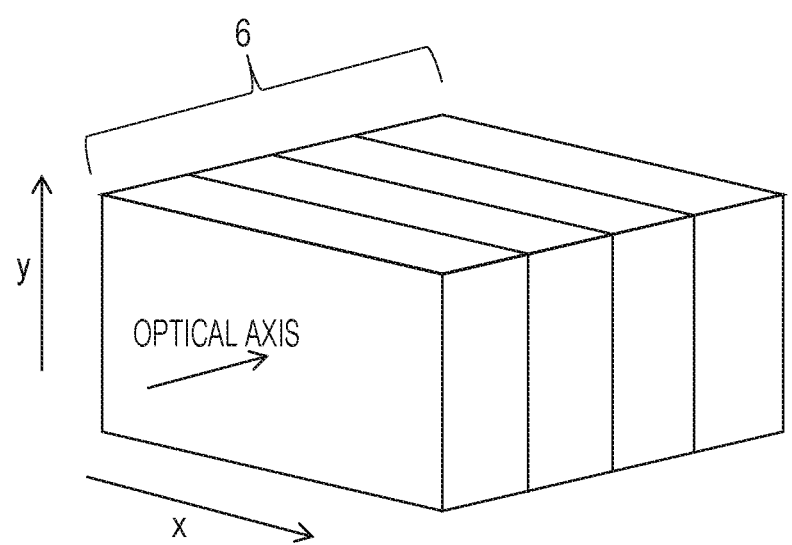
FIG. 2 is a schematic view of the optical low pass filter of an example embodiment 1.

FIG. 2 is a schematic view of the low pass filter 6 of the present embodiment. An x-axis illustrated in FIG. 2 is parallel to a long-side of the image-capturing element 7. A y-axis illustrated in FIG. 2 is parallel to a short-side of the image-capturing element 7. That is, an x-y plane is a plane parallel to the light-receiving surface 7a of the image-capturing element 7. A direction vertical to both of the x-axis and the y-axis illustrated in FIG. 2 is referred to as an optical axis direction.

The low pass filter 6 of the present embodiment has four birefringent plates each of which is a parallel and flat plate. The four birefringent plates are arranged side by side in the optical axis direction. By the birefringent plates, an incident light ray incident on the low pass filter 6 is separated into a plurality of outgoing light rays. Prior to description for the low pass filter 6 of the present embodiment, separation of a light ray by a birefringent plate will be described with the use of FIGS. 3A to 3D.

Various ones having birefringence may be used as the birefringent plate. For example, a uniaxial crystal such as crystal or lithium niobate or a biaxial crystal such as potassium titanate phosphate (KTiOPO$_4$) may be used. Further, an element having structural birefringence, such as an element whose cross-sectional structure is a periodic concavo-convex structure, may be used. Note that, the following description will be given for a case where birefringent plates 1 to 4 are formed by using a uniaxial crystal such as crystal or lithium niobate.

Figure 3A:
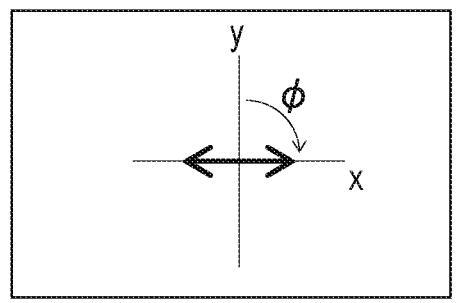
FIGS. 3A to 3D are schematic views illustrating a direction of an optic axis of a birefringent plate and separation of a light ray.

FIG. 3A illustrates one of the birefringent plates 1 to 4 forming the low pass filter 6 illustrated in FIG. 2 when viewed from the optical axis direction.

A two-way arrow in FIG. 3A represents orthogonal projection of an optic axis of the birefringent plate onto an x-y plane. The orthogonal projection is equivalent to orthogonal projection of the optic axis of the birefringent plate on the light-receiving surface 7a of the image-capturing element 7. In FIG. 3A, the orthogonal projection of the optic axis on the x-y plane forms an angle of φ=90° to a y-axis.

Figure 3B:
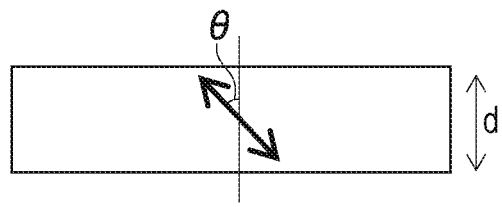

FIG. 3B illustrates the birefringent plate illustrated in FIG. 3A when viewed from the y-axis direction. The birefringent plate illustrated in FIG. 3B has a thickness of d. A two-way arrow indicated with a bold line in FIG. 3B represents the optic axis. As illustrated in FIG. 3B, the optic axis is tilted by an angle of θ to the optical axis. In other words, the optic axis of the birefringent plate illustrated in FIG. 3A is tilted with respect to the x-y plane. It has been known that when the optic axis is tilted with respect to the optical axis as described above in the parallel and flat birefringent plate, an incident light ray incident on the birefringent plate is separated into two outgoing light rays.

Figure 3C:
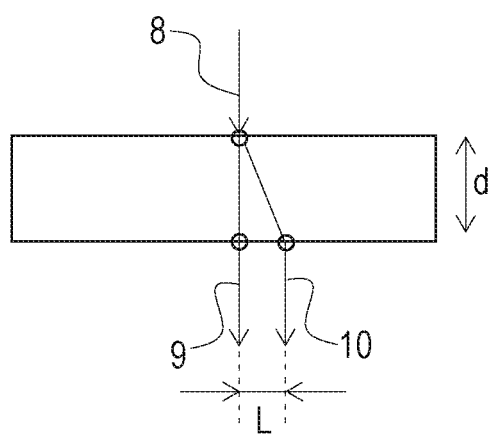

FIG. 3C illustrates a state where a light ray 8 is separated by the birefringent plate illustrated in FIG. 3B. When the light ray 8 is incident on the birefringent plate, the light ray 8 is separated into an ordinary ray 9 and an extraordinary ray 10. When the light ray 8 is vertically incident an the birefringent plate, the ordinary ray 9 is transmitted straightly through the birefringent plate. On the other hand, the extraordinary ray 10 of the incident light ray 8 is transmitted through the birefringent plate on a light path different from that of the ordinary ray 9 as illustrated in FIG. 3C.

As a result, the ordinary ray 9 and the extraordinary ray 10 are output from different positions of the birefringent plate. At this time, a distance L between the position at which the ordinary ray 9 is output and the position at which the extraordinary ray 10 is output in the birefringent plate is called a separation width. The separation width is able to take various values by controlling θ or d of the birefringent plate.

Figure 3D:
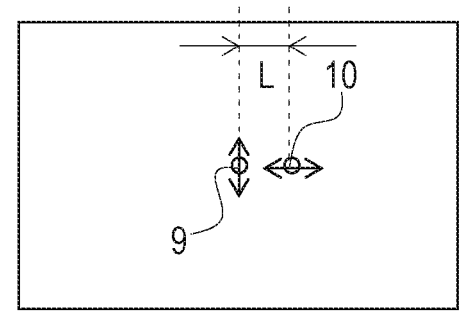

FIG. 3D illustrates a case where the state of separation of the light ray illustrated in FIG. 3C is viewed from the optical axis direction. Two-way arrows each indicated with a fine line in FIG. 3D represent polarization directions of the ordinary ray 9 and the extraordinary ray 10. As illustrated in FIG. 3D, each of the ordinary ray 9 and the extraordinary ray 10 is separated in a direction parallel to the orthogonal projection of the optic axis on the x-y plane illustrated in FIG. 3A. At this time, the polarization direction of the ordinary ray 9 is orthogonal to the separation direction. The polarization direction of the extraordinary ray 10 is parallel to the separation direction.

Next, the four birefringent plates 1 to 4 forming the low pass filter 6 of the present embodiment will be described. FIGS. 4A to 4D illustrate orthogonal projection of the optic axis of each of the birefringent plates 1 to 4 on the x-y plane. FIGS. 4A, 4B, 4C, and 4D respectively illustrate orthogonal projection of the first birefringent plate 1, the second birefringent plate 2, the third birefringent plate 3, and the fourth birefringent plate 4.

Figure 4A:
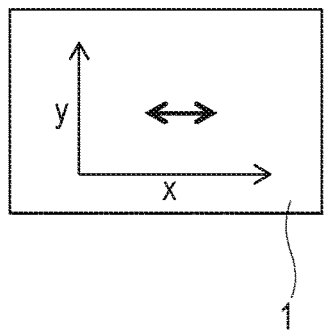
FIGS. 4A to 4D illustrate separation directions of a light ray of first to fourth birefringent plates, respectively.
Figure 4B:
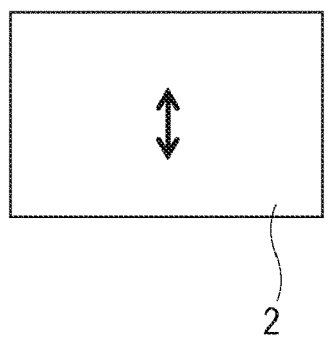

As illustrated in FIG. 4A, the orthogonal projection of the optic axis of the first birefringent plate 1 on the x-y plane is parallel to the x-axis. That is, orthogonal projection of the optic axis of the first birefringent plate 1 on the light-receiving surface 7a is parallel to the long side of the image-capturing element 7. As illustrated in FIG. 4B, the orthogonal projection of the optic axis of the second birefringent plate 2 on the x-y plane is parallel to the y-axis. That is, orthogonal projection of the optic axis of the second birefringent plate 2 on the light-receiving surface 7a is parallel to the short side of the image-capturing element 7.

Figure 4C:
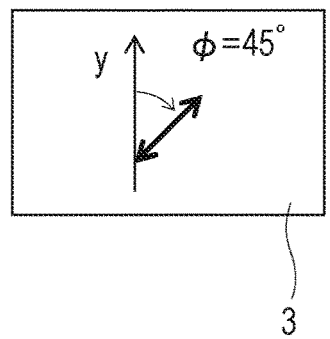
Figure 4D:
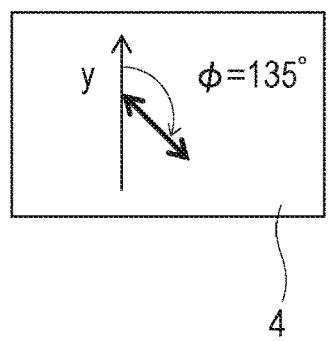

As illustrated in FIG. 4C, the orthogonal projection of the optic axis of the third birefringent plate 3 on the x-y plane forms an angle of 45° to the y-axis. That is, orthogonal projection of the optic axis of the third birefringent plate 3 on the light-receiving surface 7a forms an angle of 45° to the short side of the image-capturing element 7. As illustrated in FIG. 4D, the orthogonal projection of the optic axis of the fourth birefringent plate 4 on the x-y plane forms an angle of 135° to the y-axis. That is, orthogonal projection of the optic axis of the fourth birefringent plate 4 on the light-receiving surface 7a forms an angle of 90° to the orthogonal projection of the optic axis of the third birefringent plate 3 on the light-receiving surface 7a.

The first birefringent plate 1 separates the incident light ray 8 in a first direction that is either one of directions indicated by a two-way arrow illustrated in FIG. 4A. At this time, the first direction is defined as either one of the directions indicated by the two-way arrow in FIG. 4A by an angle formed by the optic axis of the first birefringent plate 1 and the optical axis, and may be either of them because the directions indicated by the two-way arrow are equivalent to each other. That is, the position at which the extraordinary ray 10 is output is shifted from the position, at which the ordinary ray 9 is output, by the separation width in a positive direction or a negative direction with respect to the x-axis.

Similarly, the second birefringent plate 2 separates the incident light ray 8 in a second direction that is either one of directions indicated by a two-way arrow illustrated in FIG. 4B. The third birefringent plate 3 separates the incident light ray 8 in a third direction that is either one of directions indicated by a two-way arrow illustrated in FIG. 4S. The fourth birefringent plate 4 separates the incident light ray 8 in a fourth direction that is either one of directions indicated by a two-way arrow illustrated in FIG. 4D.

Next, the separation width in each of the first birefringent plate 1 to the fourth birefringent plate 4 will be described. In the low pass filter 6, the separation widths of the first birefringent plate 1 and the second birefringent plate 2 are set to be equal to each other so that frequency characteristics in the direction parallel to the long side of the image-capturing element 7 and the direction parallel to the short side of the image-capturing element 7 are equivalent to each other. In this case, even when there is a difference between the separation widths of the first birefringent plate 1 and the second birefringent plate 2, the separation widths are able to be regarded as being equal to each other when the difference between the separation widths has a magnitude within 5% of the wider separation width of the separation widths of the first birefringent plate 1 and the second birefringent plate 2.

In addition, the separation widths of the third birefringent plate 3 and the fourth birefringent plate 4 are set to be equal to each other, so that frequency characteristics in the two directions each forming the angle of 45° to the short side of the image-capturing element 7 are equivalent to each other. In this case, even when there is a difference between the separation widths of the third birefringent plate 3 and the fourth birefringent plate 4, the separation widths are able to be regarded as being equal to each other when the difference between the separation widths has a magnitude within 5% of the wider separation width of the separation widths of the third birefringent plate 3 and the fourth birefringent plate 4.

When the separation width of each of the first birefringent plate 1 and the second birefringent plate 2 is a and the separation width of each of the third birefringent plate 3 and the fourth birefringent plate 4 is b, the low pass further 6 satisfies the following conditional expression.

$$1.15 < b/a < 3 \quad (1)$$

When b is greater than a, the cut-off frequency in the diagonal direction (the two directions each forming the angle of 45° to the short side of the image-capturing element 7) is able to be made lower than the cut-off frequency in the vertical/horizontal direction (the direction parallel to the long side of the image-capturing element 7 and the direction parallel to the short side of the image-capturing element 7). As a result, it is possible to reduce occurrence of moire and false color in the diagonal direction while keeping perceived resolution in the vertical/horizontal direction.

When a value of b/a is greater than an upper limit of the expression (1), the cut-off frequency in the diagonal direction is able to be made lower, but contrast at high frequency increases due to a folding. On the other hand, when the value of b/a is smaller than a lower limit of the expression (1), a difference between the cut-off frequency in the diagonal direction and the cut-off frequency in the vertical/horizontal direction becomes too small. Thus, it is difficult to reduce occurrence of moire and false color in the diagonal direction while keeping perceived resolution in the vertical/horizontal direction.

Note that, when a range of the expression (1) is set as a range of an expression (1a), it is possible to further reduce occurrence of moire and false color in the diagonal direction.

$$1.42 < b/a < 2.5 \quad (1a)$$

Next, laminating order of the four birefringent plates 1 to 4 described above in the low pass filter 6 will be described. An angle formed by each orthogonal projection of the optic axes of adjacent two birefringent plates on the x-y plane in the laminating order of the four birefringent plates 1 to 4 is considered to form an angle of 90° or 45°. When the angle of 90° is formed, a member that aligns the polarization direction, such as a λ/4 plate, needs to be provided between the two birefringent plates in order to perform separation twice by the two birefringent plates. In this case, the thickness of the low pass filter 6 is increased by the thickness of the λ/4 plate.

Thus, the four birefringent plates 1 to 4 are desired to be arranged in order by which the optic axes of adjacent birefringent plates form the angle of 45°. That is, either the third birefringent plate 3 or the fourth birefringent plate 4 is arranged between the first birefringent plate 1 and the second birefringent plate 2 and either the first birefringent plate 1 or the second birefringent plate 2 is arranged between the third birefringent plate 3 and the fourth birefringent plate 4. As such an arrangement, eight patterns indicated in Table below are considered. Thereby, one incident light ray is separated four times in total.

TABLE

| | laminating order 1 | laminating order 2 | laminating order 3 | laminating order 4 | laminating order 5 | laminating order 6 | laminating order 7 | laminating order 8 |
|---|---|---|---|---|---|---|---|---|
| first | 1 | 1 | 2 | 2 | 3 | 3 | 4 | 4 |
| second | 3 | 4 | 3 | 4 | 1 | 2 | 1 | 2 |
| third | 2 | 2 | 1 | 1 | 4 | 4 | 3 | 3 |
| fourth | 4 | 3 | 4 | 3 | 2 | 1 | 2 | 1 |

In Table, the first represents a position that is farthest from a position of the light-receiving surface 7a and the fourth represents a position that is closest to the position of the light-receiving surface 7a when the low pass filter 6 is arranged on a front of the light-receiving surface 7a. Additionally, in Table, 1 to 4 respectively represent the first birefringent plate 1 to the fourth birefringent plate 4. By arranging the four birefringent plates 1 to 4 in any order indicated in Table, the thickness of the low pass filter 6 is able to be reduced.

In the low pass filter 6 of the present embodiment, the second birefringent plate 2, the third birefringent plate 3, the first birefringent plate 1, and the fourth birefringent plate 4 are included so as to be arranged in an order starting from a light-incident side. That is, the four birefringent plates 1 to 4 are laminated in the laminating order 3 indicated in Table. The separation of the incident light ray by the low pass filter 6 in this case will be described with the use of FIGS. 5A to 5E. Note that, the separation directions of the birefringent plates 1 to 4 are indicated by arrows in FIGS. 5B to 5E, respectively.

Here, the separation direction of each of the birefringent plates 1 to 4 may be a direction different by 180°, as illustrated in FIGS. 4A to 4D. For example, though the second birefringent plate 2 separates the extraordinary ray in a positive direction of a y-axis with respect to the ordinary ray in the following description, the second birefringent plate 2 may separate the extraordinary ray in a negative direction of the y-axis with respect to the ordinary ray.

Figure 5A:
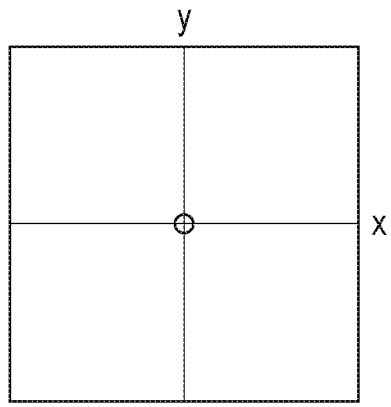
FIGS. 5A to 5E illustrate a state of separation of a light ray by the optical low pass filter.
Figure 5A:
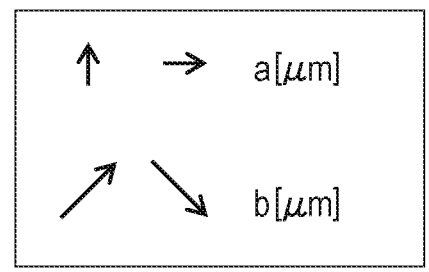

Each of FIGS. 5A to 5E illustrates coordinates of a light ray. FIG. 5A illustrates the coordinates of an incident light ray in a case where a position at which the incident light ray is incident on the low pass filter 6 is set as the origin.

Figure 5B:
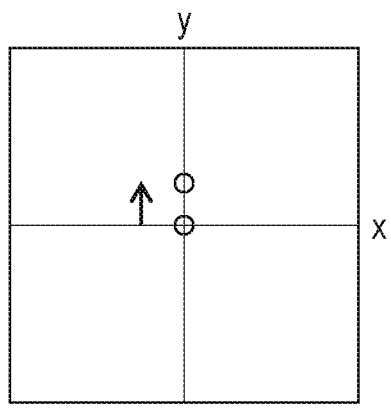

FIG. 5B illustrates a state where an incident light ray is separated by the second birefringent plate 2. The second birefringent plate 2 separates the incident light ray in a direction parallel to the y-axis as illustrated in FIG. 5B. An ordinary ray is transmitted as it is, so that the coordinates remains as (0, 0). On the other hand, an extraordinary ray is shifted from the ordinary ray by the separation width a in the positive direction of the y-axis. Thus, the coordinates of the extraordinary ray becomes (0, a). At this time, a polarization direction of the ordinary ray is the x-axis direction and a polarization direction of the extraordinary ray is the y-axis direction. Both of the two light rays separated by the second birefringent plate 2 and output therefrom are incident on the third birefringent plate 3.

Figure 5C:
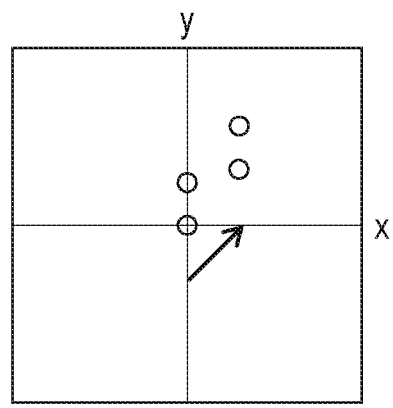

FIG. 5C illustrates a state where a light ray is separated by the third birefringent plate 3. The third birefringent plate 3 separates an incident light ray in a direction that forms an angle of 45° with respect to the y-axis as illustrated in FIG. 5C. Each of the polarization directions of the two light rays output from the second birefringent plate 2 forms an angle of 45° with respect to the separation direction of the third birefringent plate 3. Thus, each of the light rays incident on the third birefringent plate 3 is separated into an ordinary ray and an extraordinary ray by the third birefringent plate 3. At this time, the intensity of the ordinary ray and that of the extraordinary ray are equal.

The ordinary ray is transmitted as it is through the third birefringent plate 3. On the other hand, the extraordinary ray is shifted by the separation width b in the separation direction of the third birefringent plate 3. Thus, the light ray whose coordinates are (0, 0) is separated into a light ray whose coordinates are (0, 0) and a light ray whose coordinates are (b/√2, b/√2) and the light ray whose coordinates are (0, a) is separated into a light ray whose coordinates are (0, a) and a light ray whose coordinates are (b/√2, a b/√2). At this time, a polarization direction of the ordinary ray is orthogonal to the separation direction of the third birefringent plate 3 and a polarization direction of the extraordinary ray is parallel to the separation direction of the third birefringent plate 3. The four light rays separated by the third birefringent plate 3 and output therefrom are incident on the first birefringent plate 1 together.

Figure 5D:
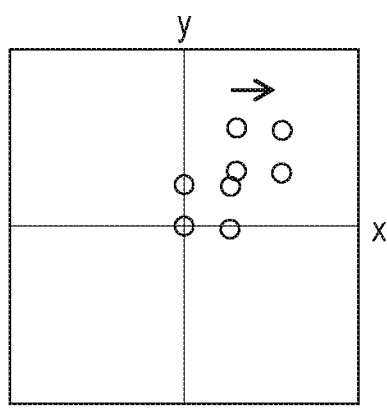

FIG. 5D illustrates a state where a light ray is separated by the first birefringent plate 1. The first birefringent plate 1 separates an incident light ray in the positive direction of the x-axis as illustrated FIG. 5D. The polarization direction of each of the four light rays output from the third birefringent plate 3 forms an angle of 45° with respect to the separation direction of the first birefringent plate 1. Thus, each light ray incident on the first birefringent plate 1 is separated into an ordinary ray and an extraordinary ray by the first birefringent plate 1. At this time, the intensity of the ordinary ray and that of the extraordinary ray are equal.

In the first birefringent plate 1, each of the four light rays respectively incident on coordinates of (0, 0), (b/√2, b/√2), (0, a) and (b/√2, a+b/√2) is separated into an ordinary ray and an extraordinary ray. The ordinary ray is transmitted as it is through the first birefringent plate 1.

On the other hand, the extraordinary ray is shifted by the separation width a in the positive direction of the X-axis. Thus, the coordinates of the extraordinary rays become four of (a, 0), (a+b/√2, b/√2), (a, a) and (a+b/√2, a+b/√2). As a result, eight light rays in total are output from the first birefringent plate 1 to the fourth birefringent plate 4. At this time, a polarization direction of each of the ordinary rays is orthogonal to the separation direction of the first birefringent plate 1 and a polarization direction of each of the extraordinary rays is parallel to the separation direction of the first birefringent plate 1.

Figure 5E:
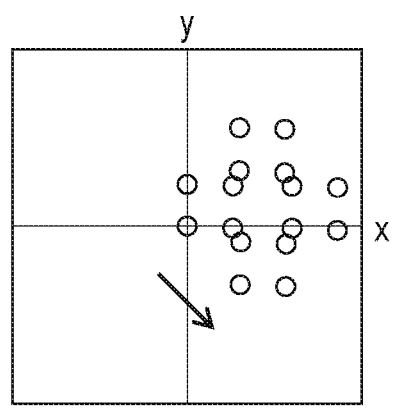

FIG. 5E illustrates a state where a light ray is separated by the fourth birefringent plate 4. The fourth birefringent plate 4 separates an incident light ray in a direction that forms an angle of 135° with respect to the y-axis as illustrated in FIG. 5E. That is, the separation direction of the fourth birefringent plate 4 is a direction that forms an angle of 90° with respect to the separation direction of the third birefringent plate 3 illustrated in FIG. 5C. Each of the polarization directions of the two light rays output from the first birefringent plate 1 forms an angle of 45° with respect to a separation direction of the fourth birefringent plate 4. Thus, each of the light rays incident on the fourth birefringent plate 4 is separated into an ordinary ray and an extraordinary ray by the fourth birefringent plate 4. At this time, the intensity of the ordinary ray and that of the extraordinary ray are equal.

The ordinary ray is transmitted as it is through the fourth birefringent plate 4. On the other hand, the extraordinary ray is shifted by the separation width b in the separation direction of the fourth birefringent plate 4. As a result, 16 light rays in total are output from the fourth birefringent plate 4 as illustrated in FIG. 5E.

As described above, an incident light ray is separated by the low pass filter 6 once in each of the vertical and horizontal directions and once in each of the two diagonal directions that are orthogonal to each other, that is, four times in total. When the separation in the x-axis direction is considered, the incident light ray is separated three times by the separation widths of a, b/√2, and b/√2 with respect to the x-axis direction.

In the low pass filter 6, dispersion $\sigma^2$ becomes an index of frequency characteristics in a frequency region lower than the cut-off frequency (hereinafter, referred to as a low frequency region), so that dispersion $\sigma^2$ of the low pass filter 6 is desired to be defined in accordance with a pixel pitch of the image-capturing element 7. The pixel pitch here means the shortest distance between pixels.

It is empirically known that dispersion of a separated light ray is proportional to the square of a separation width. Accordingly, when k is set as a proportionality factor, dispersion $\sigma_x^2$ of the x-axis direction in the aforementioned low pass filter 6 is able to be obtained by the following expression (2).

$$\sigma_x^2 = k(a^2 + (b/\sqrt{2})^2 + (b/\sqrt{2})^2) = k(a^2 + b^2) \quad (2)$$

This is similarly applied also in the y-axis direction.

On the other hand, when the separation in the diagonal direction by the low pass filter 6 is considered, the incident light ray is separated three times by the separation widths of b, a/√2 and a/√2 with respect to the diagonal direction. Accordingly, dispersion $\sigma_d^2$ in the diagonal direction is able to be obtained by the following expression (3).

$$\sigma_d^2 = k(b^2 + (a/\sqrt{2})^2 + (a/\sqrt{2})^2) = k(a^2 + b^2) \quad (3)$$

In this manner, it is shown that $\sigma_x^2$ and $\sigma_d^2$ are equal to each other and the both are proportional to $a^2 + b^2$. In order to keep relatively high contrast at a low frequency region, it is desired that the low pass filter 6 satisfies the following expression (4).

$$0.309 < (a^2 + b^2)/p^2 < 0.797 \quad (4)$$

Here, p is the pixel pitch of the image-capturing element 7. When a value of $(a^2 + b^2)/p^2$ is set to be smaller than an upper limit of the expression (4), MTF of a frequency that is lower than Nyquist frequency of the image-capturing element. 7 is able to be made relatively high, so that perceived resolution is able to be improved. When a value of $(a^2 + b^2)/p^2$ is set to be greater than a lower limit of the expression (4), MTF of a frequency that is higher than a Nyquist frequency of the image-capturing element 7 is able to be made relatively low, so that it is possible to reduce occurrence of moire.

Note that, it is more desirable that a range of the expression (4) may be a range of an expression (4a).

$$0.309 < (a^2 + b^2)/p^2 < 0.510 \quad (4a)$$

Commonly, MTF of the optical system 5 used for the image capturing apparatus 15 is sufficiently low in a frequency region of 300 lp/mm or more. In order to reduce occurrence of moire, it is therefore desired that the MTF of the low pass filter 6 is low in a range of a frequency not less than the cut-off frequency and not more than 300 lp/mm. Accordingly, the MTF in the diagonal direction in a range of a frequency not less than the cut-off frequency in the diagonal direction and not more than a frequency of 300 lp/mm is desired to be 25% or less. Thereby, it is possible to further reduce occurrence of moire in the diagonal direction.

Next, frequency characteristics of the low pass filter 6 of the present embodiment will be described. In the description below, the pixel pitch of the image-capturing element 7 is set as p=5 μm. Accordingly, the Nyquist frequency of the image-capturing element 7 is 100 lp/mm.

Figure 6:
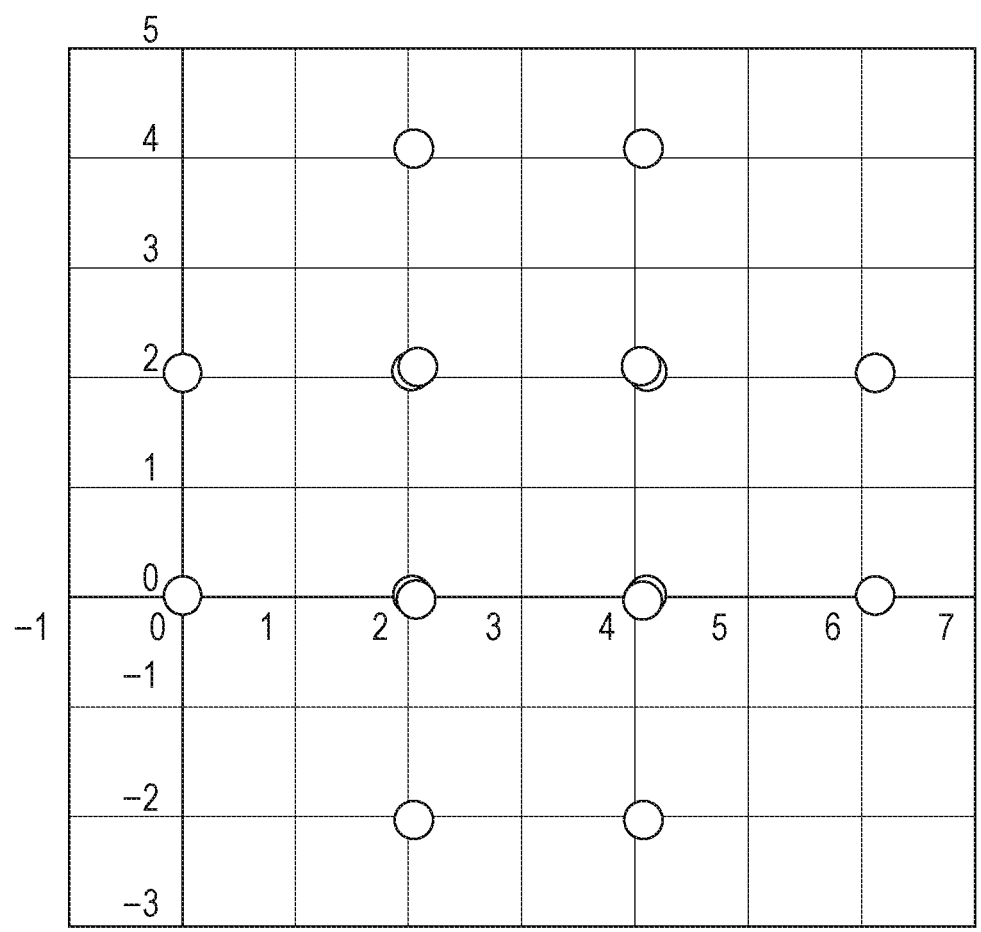
FIG. 6 illustrates positions, at each of which a light ray is output, in the optical low pass filter of the example embodiment 1.

In the present embodiment, a=2.028 μm and b=2.896 μm are provided. That is, a value of b/a is 1.43. Additionally, a value of $(a^2 + b^2)/p^2$ is 0.5. FIG. 6 illustrates positions at each of which a light ray obtained by being separated by the low pass filter 6 in this case is output.

Figure 7:
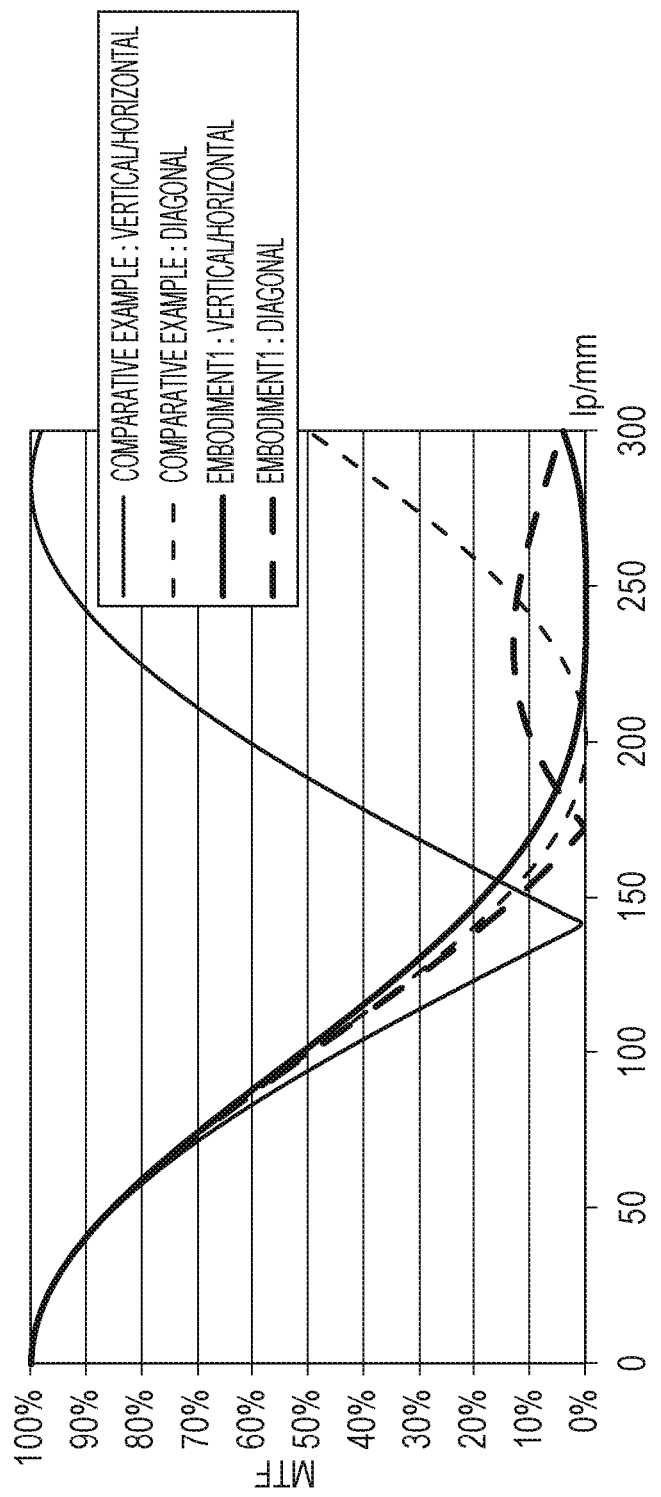
FIG. 7 illustrates frequency characteristics of the optical low pass filter of the example embodiment 1.

Such frequency characteristics of the low pass filter 6 are illustrated in FIG. 7. A bold solid line in FIG. 7 indicates frequency characteristics in the vertical/horizontal direction of the low pass filter 6 of the present embodiment. Additionally, a bold broken line in FIG. 7 indicates frequency characteristics in the diagonal direction of the low pass filter 6 of the present embodiment.

A fine solid line and a fine broken line in FIG. 7 indicate frequency characteristics of a low pass filter of a comparative example. The comparative example has a configuration in which a λ/4 plate is arranged between two birefringent plates whose separation directions are orthogonal to each other, and an incident light ray is separated into four light rays.

A separation width of each of the two birefringent plates in the comparative example is 3.535 μm. At this time, the dispersion of the light ray which is separated by the low pass filter 6 of an example embodiment 1 is equal to dispersion of the light ray which is separated by the low pass filter of the comparative example. Accordingly, as illustrated in FIG. 7, both the example embodiment 1 and the comparative example have similar frequency characteristics in a range of a frequency of 0 to 50 lp/mm. That is, comparison of frequency characteristics at a high frequency region is able to be performed between the present embodiment and the comparative example in a state where the frequency characteristics are the same at a low frequency region.

As shown by the frequency characteristics of the present comparative example illustrated in FIG. 7, a cut-off frequency in a vertical/horizontal direction is about 140 lp/mm, and a cut-off frequency in a diagonal direction is 200 lp/mm. That is, in the present comparative example, the cut-off frequency in the diagonal direction is higher than the cut-off frequency in the vertical/horizontal direction. Thus, it is difficult for the low pass filter of the present comparative example to reduce moire and false color in the diagonal direction even when moire in the vertical/horizontal direction is able to be reduced.

On the other hand, in the low pass filter 6 of the present embodiment, the cut-off frequency in the diagonal direction is able to be set to be lower than the cut-off frequency in the vertical/horizontal direction. This is because the low pass filter 6 satisfies the aforementioned expression (1). Thereby, it is possible to reduce occurrence of moire and false color in the diagonal direction while keeping perceived resolution high in the vertical/horizontal direction.

The frequency characteristics in the vertical/horizontal direction of the comparative example increases at a frequency that is equal to or more than the cut-off frequency in a returning manner. On the other hand, as to the frequency characteristics in the vertical/horizontal direction of the present embodiment, the MTF is 5% or less in a range from about 200 to 300 lp/mm, so that it is shown that occurrence of moire is able to be reduced compared to the case of the comparative example.

Example Embodiment 2

Next, a low pass filter of an example embodiment 2 will be described. The low pass filter of the example embodiment 2 is similar to the low pass filter 6 of the example embodiment 1 except for a separation width, and is formed by four birefringent plates of a first birefringent plate 1 to a fourth birefringent plate 4. For the low pass filter of the present embodiment, a=2.273 μm and b=2.708 μm are provided. Additionally, a value of b/a is 1.19. Dispersion of a light ray which is separated by the low pass filter in the present embodiment is equal to the dispersion of the light ray which is separated by the low pass filter 6 in the example embodiment 1.

Figure 8:
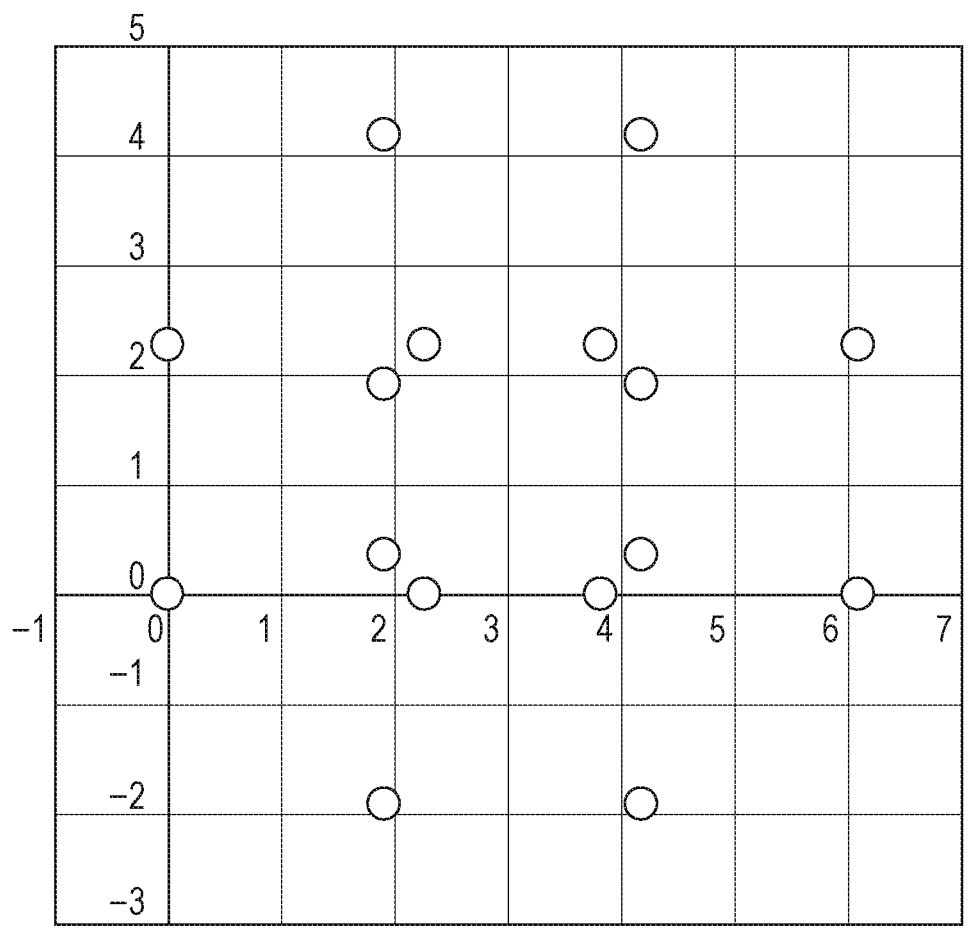
FIG. 8 illustrates positions, at each of which a light ray is output, in an optical low pass filter of an example embodiment 2.

A light ray incident on the low pass filter of the present embodiment is separated by the four birefringent plates 1 to 4 four times in total, and thereby output as 16 light rays in total. FIG. 8 illustrates positions at each of which a light ray obtained by being separated by the low pass filter of the present embodiment is output.

Figure 9:
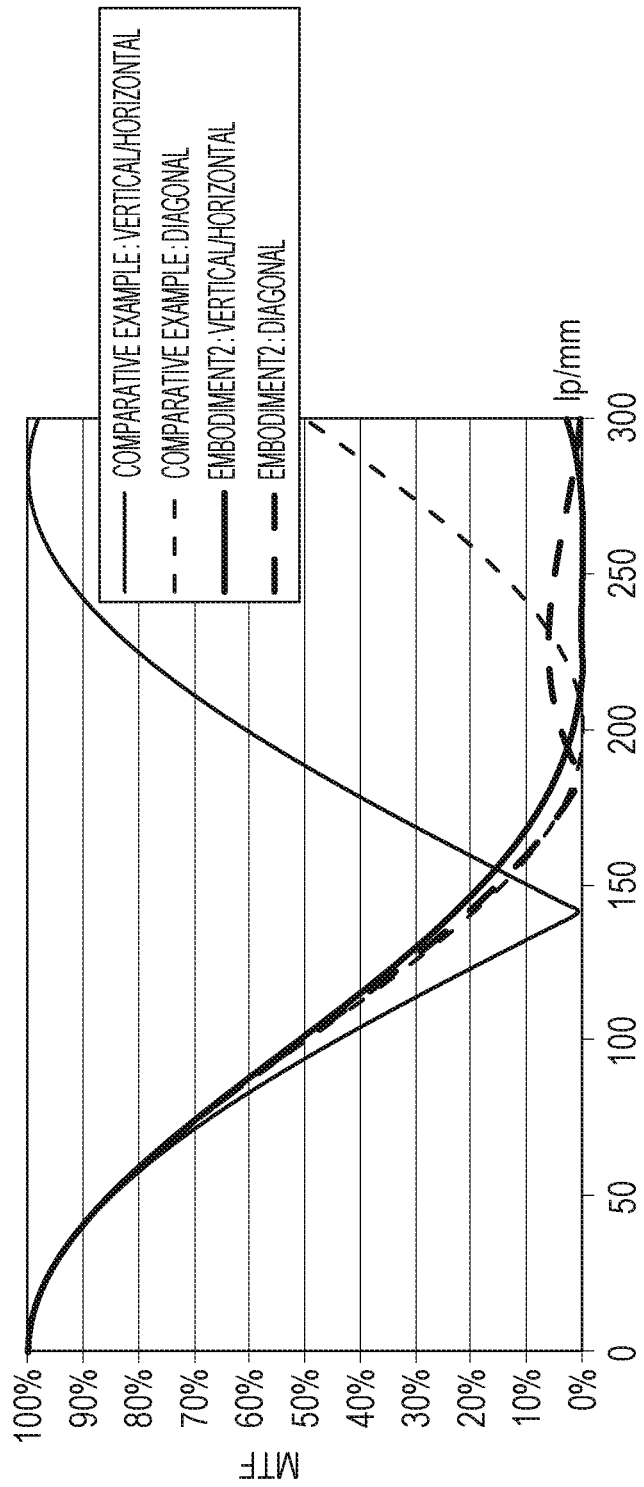
FIG. 9 illustrates frequency characteristics of the optical low pass filter of the example embodiment 2.

Such frequency characteristics of the low pass filter in the present embodiment are illustrated in FIG. 9. A bold solid line in FIG. 9 indicates frequency characteristics in a vertical/horizontal direction of the low pass filter of the present embodiment. Moreover, a bold broken line in FIG. 9 indicates frequency characteristics in a diagonal direction of the low pass filter of the present embodiment.

Additionally, a fine solid line and a fine broken line of FIG. 9 indicate the frequency characteristics of the low pass filter of the aforementioned comparative example. The configuration of the comparative example is the same as the configuration described in the example embodiment 1.

As described above, the dispersion of the light ray which is separated by the low pass filter in the present embodiment is equal to the dispersion of the light ray which is separated by the low pass filter 6 in the example embodiment 1. Therefore, the example embodiment 2 has frequency characteristics equivalent to those of the example embodiment 1 and the comparative example in a range of 0 to 50 lp/mm.

In comparison of FIG. 9 and FIG. 7, a difference between a cut-off frequency in the vertical/horizontal direction and a cut-off frequency in the diagonal direction of the example embodiment 2 is smaller than that of the example embodiment 1. In other words, the cut-off frequency in the diagonal direction in the example embodiment 2 is higher than the cut-off frequency in the diagonal direction in the example embodiment 1. This is because the value of b/a in the present embodiment is made to be smaller than that of the example embodiment 1.

However, in the present embodiment, folding of the frequency characteristics is as small as approximately 7% at a frequency higher than the cut-off frequency in the diagonal direction. Thus, the low pass filter in the present embodiment is able to reduce occurrence of false color even at a frequency higher than that of the example embodiment 1.

Example Embodiment 3

Next, a low pass filter of an example embodiment 3 will be described. The low pass filter of the example embodiment 3 is similar to the low pass filters of the example embodiment 1 and the example embodiment 2 except for a separation width, and is formed by four birefringent plates of a first birefringent plate 1 to a fourth birefringent plate 4. In the low pass filter of the present embodiment, a=1.768 µm and b=3.062 µm are provided. Additionally, a value of b/a is 1.73. Dispersion of a light ray which is separated by the low pass filter in the present embodiment is equal to the dispersion of the light ray which is separated by the low pass filter 6 in the example embodiment 1.

Figure 10:
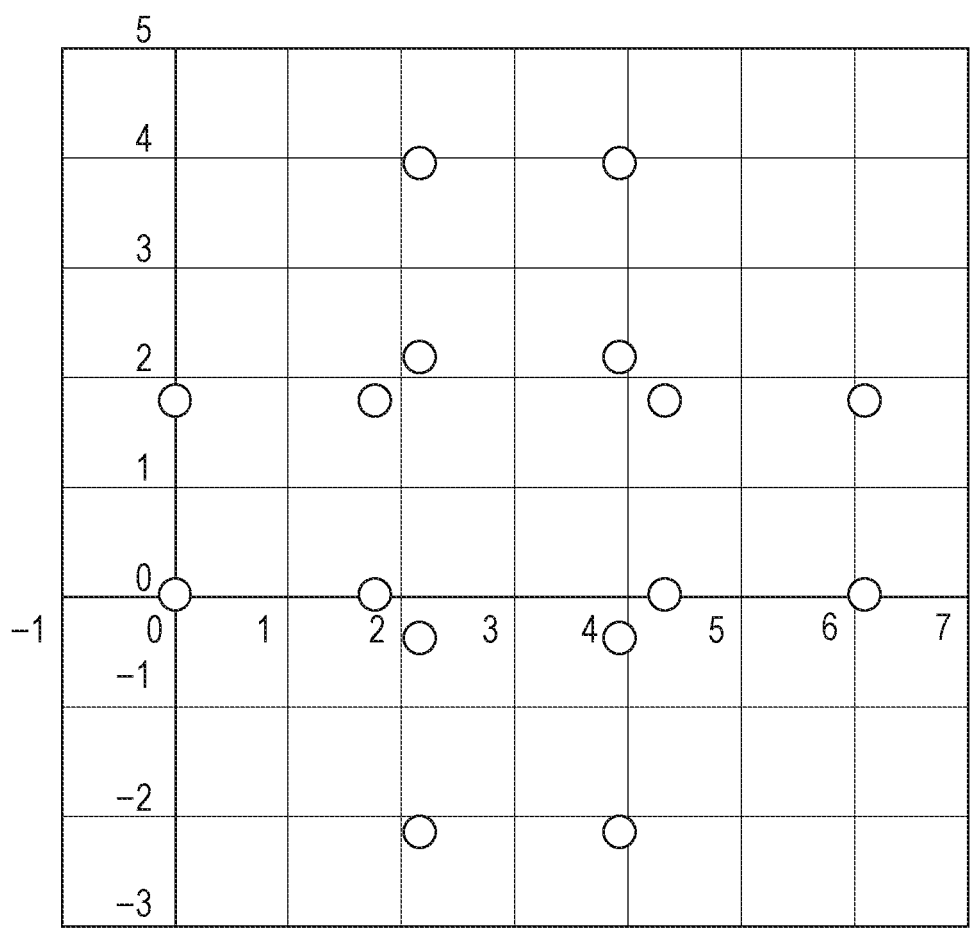
FIG. 10 illustrates positions, at each of which a light ray is output, in an optical low pass filter of an example embodiment 3.

A light ray incident on the low pass filter of the present embodiment is separated by the four birefringent plates 1 to 4 four times in total, and output as 16 light rays in total. FIG. 10 illustrates positions at each of which a light ray separated by the low pass filter of the present embodiment is output.

Figure 11:
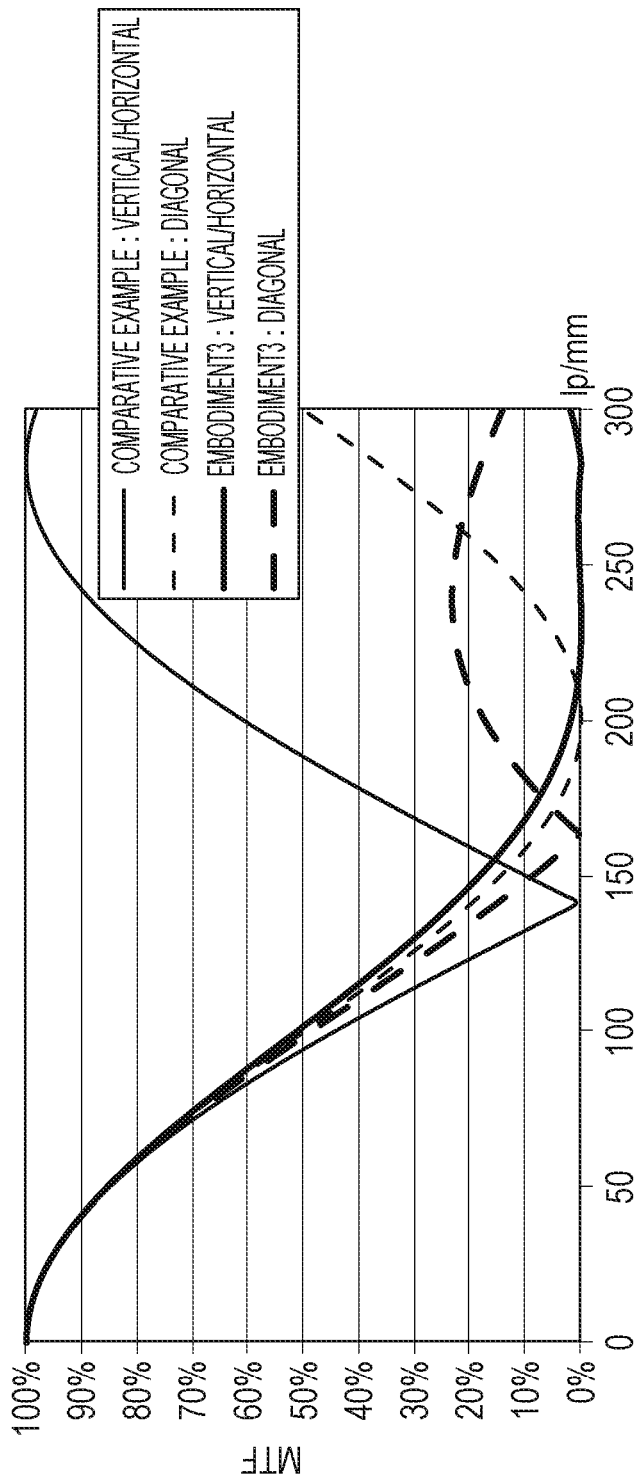
FIG. 11 illustrates frequency characteristics of the optical low pass filter of the example embodiment 3.

Such frequency characteristics of the low pass filter in the present embodiment are illustrated in FIG. 11. A bold solid line in FIG. 11 indicates frequency characteristics in a vertical/horizontal direction of the low pass filter in the present embodiment. Moreover, a bold broken line in FIG. 11 indicates frequency characteristics in the diagonal direction of the low pass filter in the present embodiment.

Additionally, a fine solid line and a fine broken line illustrated in FIG. 11 indicate frequency characteristics of the low pass filter in the aforementioned comparative example. The configuration of the comparative example is the same as the configuration described in the example embodiment 1.

As described above, the dispersion of the light ray which is separated by the low pass filter in the present embodiment is equal to the dispersion of the light ray which is separated by the low pass filter 6 in the example embodiment 1. Therefore, the example embodiment 3 has frequency characteristics equivalent to those of the example embodiment 1 and the comparative example in a range of 0 to 50 lp/mm.

In comparison of FIG. 11 and FIG. 7, a difference between a cut-off frequency in the vertical/horizontal direction and a cut-off frequency in the diagonal direction of the example embodiment 3 is greater than that of the example embodiment 1. In other words, the cut-off frequency in the diagonal direction in the example embodiment 3 is lower than the cut-off frequency in the diagonal direction of the example embodiment 1. This is because the value of b/a in the present embodiment is made to be greater than that of the example embodiment 1. Thus, the low pass filter of the present embodiment is able to reduce occurrence of false color in the diagonal direction at a low spatial frequency compared to that of the example embodiment 1.

Example Embodiment 4

Next, a low pass filter of an example embodiment 4 will be described. The low pass filter of the example embodiment 4 is similar to the low pass filters which are described in the example embodiments 1 to 3 except for a separation width, and is formed by four birefringent plates of a first birefringent plate 1 to a fourth birefringent plate 4. In the low pass filter of the present embodiment, a=1.581 µm and b=3.162 µm are provided. Additionally, a value of b/a is 2.0. Dispersion of a light ray which is separated by the low pass filter in the present embodiment is equal to the dispersion of the light ray which is separated by the low pass filter 6 in the example embodiment 1.

Figure 12:
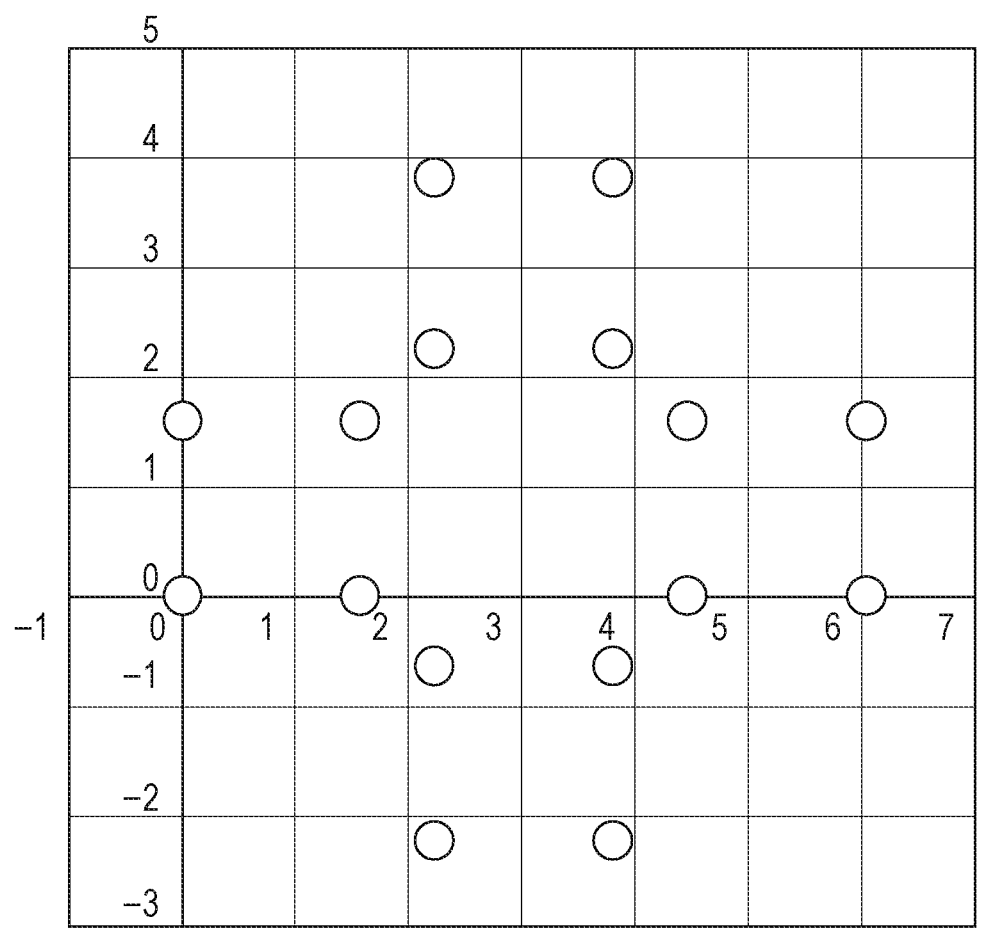
FIG. 12 illustrates positions, at each of which a light ray is output, in an optical low pass filter of an example embodiment 4.

A light ray incident on the low pass filter of the present embodiment is separated by the four birefringent plates 1 to 4 four times in total, and output as 16 light rays in total. FIG. 12 illustrates positions at each of which a light ray separated by the low pass filter in the present embodiment is output.

Figure 13:
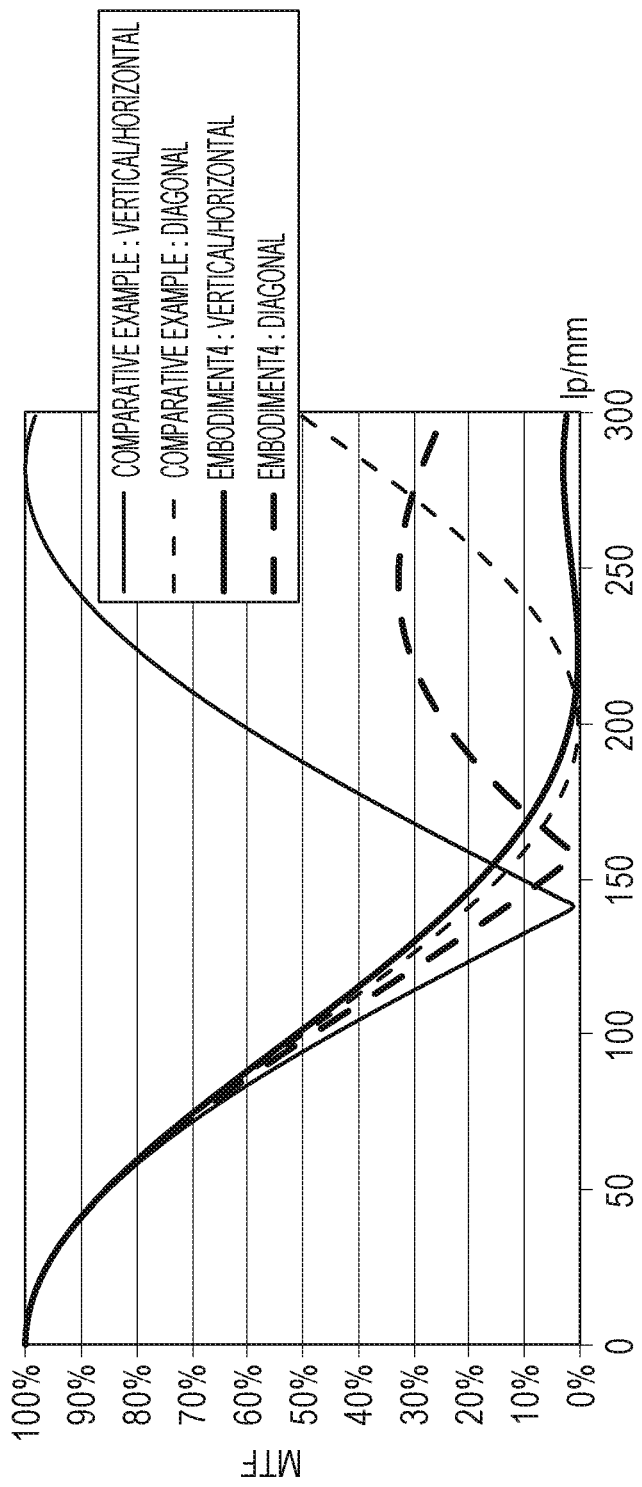
FIG. 13 illustrates frequency characteristics of the optical low pass filter of the example embodiment 4.

Such frequency characteristics of the low pass filter of the present embodiment is illustrated in FIG. 13. A bold solid line in FIG. 13 indicates frequency characteristics in a vertical/horizontal direction of the low pass filter in the present embodiment. Moreover, a bold broken line in FIG. 13 indicates frequency characteristics in a diagonal direction of the low pass filter in the present embodiment. Additionally, a fine solid line and a fine broken line in FIG. 13 indicate the frequency characteristics of the low pass filter of the aforementioned comparative example. The configuration of the comparative example is the same as the configuration described in the example embodiment 1.

As described above, the dispersion of the light ray which is separated by the low pass filter in the present embodiment is equal to the dispersion of the light ray which is separated by the low pass filter 6 in the example embodiment 1. Therefore, the example embodiment 4 has frequency characteristics equivalent to those of the example embodiment 1 and the comparative example in a range of 0 to 50 lp/mm.

It is shown that, also in the present embodiment, a cut-off frequency in the diagonal direction is able to be made low compared to that in the vertical/horizontal direction. As the value of b/a is made greater, it is possible to lower the cut-off frequency in the diagonal direction compared to that in the vertical/horizontal direction. On the other hand, there is a tendency that, as the value of b/a is made greater, folding of MTF in the diagonal direction becomes greater and contrast at a high frequency increases. However, when the value of b/a is smaller than the upper limit of the expression (1), contrast by folding at a frequency region equal to or higher than the cut-off frequency is able to be 60% or less, so that it is possible to reduce occurrence of moire and false color resulting from the folding.

Although description has been given in the example embodiments 1 to 4, which are described above, by setting that the pixel pitch p is 5 μm, the invention is able to be applied to any other pixel pitch. In these cases, the separation widths a and b may be set in accordance with the Nyquist frequency of the image-capturing element 7.

However, when influence of diffraction by the optical system 5 and the number of pixels of the image-capturing element 7 are taken into consideration, in a case where the pixel pitch p is not less than 3 μm and not more than 7 μm, it is possible to remarkably reduce occurrence moire by the low pass filter 6. Therefore, it is desired that the low pass filter 6 that is described through the example embodiments 1 to 4 is used for an image-capturing element whose pixel pitch p is not less than 3 μm and not more than 7 μm.

Figure 14:
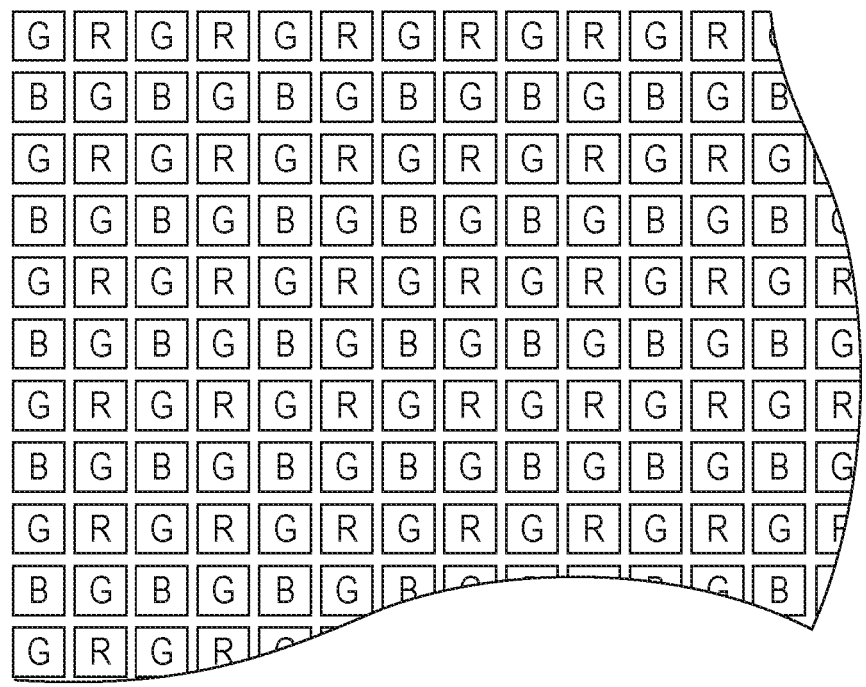
FIG. 14 is a schematic view of a color filter of a Bayer array.

When the image-capturing element 7 has a color filter of a Bayer array as illustrated in FIG. 14, moire especially in a diagonal direction easily becomes false color to appear. Here, each region surrounded by a square in FIG. 14 represents a pixel. In the pixels, reference signs of G, R, and B respectively illustrate color filters of green, red, and blue.

The low pass filter 6 described in each of the example embodiments 1 to 4 is able to lower the cut-off frequency in the diagonal direction compared to the cut-off frequency in the vertical/horizontal direction, so that it is possible to further reduce occurrence of moire in the diagonal direction. Accordingly, by using the low pass filter 6 described in each of the example embodiments 1 to 4 for the image-capturing element having the color filter of the Bayer array, it is possible to reduce occurrence of false color.

Modified Example

Figure 15:
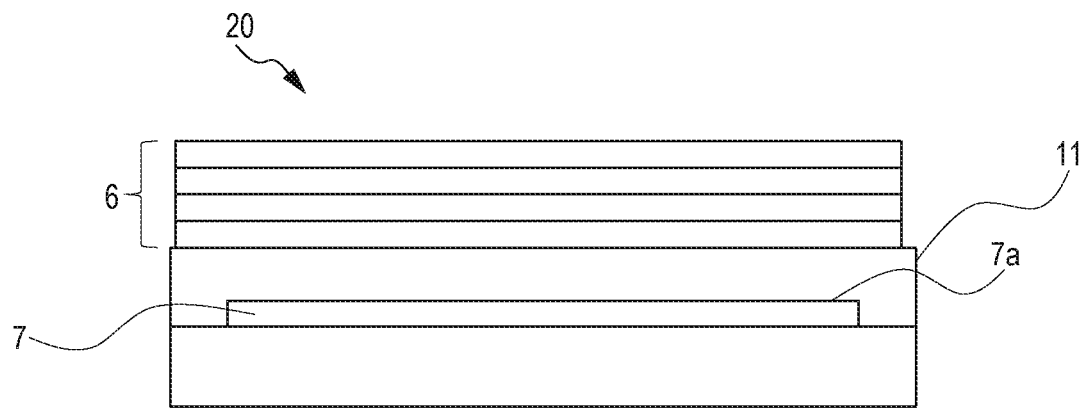
FIG. 15 is a schematic view of an image capturing unit.

Next, as a modified example, an image capturing unit 20 having the low pass filter 6 described in the example embodiments 1 to 4 will be described. FIG. 15 illustrates a schematic view of the image capturing unit 20 of the present modified example. The image capturing unit 20 has the image-capturing element 7 which is bonded to an inside of a package 11 with the use of an adhesive or the like. The image-capturing element 7 is a CCD, a CMOS, or the like. Additionally, the low pass filter 6 described in the example embodiments 1 to 4 is arranged on the light-receiving surface 7a side of the image-capturing element 7.

The low pass filter 6 described in the example embodiments 1 to 4 is able to lower the cut-off frequency in the diagonal direction compared to the cut-off frequency in the vertical/horizontal direction. Accordingly, by arranging the low pass filter 6 described in the example embodiments 1 to 4 on the light-receiving surface 7a side of the image capturing unit 20, it is possible to obtain an image in which occurrence of moire in the diagonal direction is further reduced.

In the present modified example, the low pass filter 6 also has a function as a protective plate that protects the image-capturing element 7. The low pass filter 6 has also the function as the protective plate, so that is possible to reduce a size of the image capturing unit 20.

Note that, though FIG. 2 and FIG. 15 illustrate a case where the four birefringent plates 1 to 4 are laminated so as to closely adhere to each other, the invention is not limited thereto. In the four birefringent plates 1 to 4 of the low pass filter 6, the birefringent plates may have a space therebetween, or a material other than the birefringent plate, such as an infrared cut filter, may be arranged.

As above, though desirable embodiments for the invention have been described, the invention is not limited to the embodiments, and various combinations, modifications, and changes are possible within the scope of the gist thereof.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2016-130913 filed Jun. 30, 2016, which is hereby incorporated by reference herein in its entirety.

What is claimed is:

1. An optical low pass filter arranged on a side of a light-receiving surface of an image-capturing element, the optical low pass filter comprising:
   a first birefringent plate of which an orthogonal projection of an optic axis onto the light-receiving surface is parallel to a long side of the image-capturing element;
   a second birefringent plate of which an orthogonal projection of an optic axis onto the light-receiving surface is parallel to a short side of the image-capturing element;
   a third birefringent plate of which an orthogonal projection of an optic axis onto the light-receiving surface forms an angle of 45° to the short side of the image-capturing element; and
   a fourth birefringent plate of which an orthogonal projection of an optic axis onto the light-receiving surface forms an angle of 90° to the orthogonal projection of the optic axis of the third birefringent plate onto the light-receiving surface,
   wherein the following conditional expression is satisfied:

$1.43 \leq b/a < 3$, where a represents a separation width of an incident light ray in each of the first birefringent plate and the second birefringent plate, and b represents a separation width of an incident light ray in each of the third birefringent plate and the fourth birefringent plate.

2. The optical low pass filter according to claim 1, wherein
   either the third birefringent plate or the fourth birefringent plate is arranged between the first birefringent plate and the second birefringent plate, and
   either the first birefringent plate or the second birefringent plate is arranged between the third birefringent plate and the fourth birefringent plate.

3. The optical low pass filter according to claim 1, wherein
   both of a value of MTF in a direction parallel to the orthogonal projection of the optic axis of the third birefringent plate onto the light-receiving surface and a value of MTF in a direction parallel to the orthogonal projection of the optic axis of the fourth birefringent plate onto the light-receiving surface are equal to or less than 25% in a range of a frequency not less than a cut-off frequency and not more than 300 lp/mm.

4. The optical low pass filter according to claim 1, wherein the optical low pass filter separates an incident light ray into 16 or more light rays.

5. An optical low pass filter arranged on a side of a light-receiving surface of an image-capturing element, the optical low pass filter comprising:
   a first birefringent plate that separates an incident light ray in a first direction parallel to a long side of the image-capturing element;
   a second birefringent plate that separates an incident light ray in a second direction parallel to a short side of the image-capturing element;
   a third birefringent plate that separates an incident light ray in a third direction that forms an angle of 45° to the short side of the image-capturing element on the light-receiving surface; and
   a fourth birefringent plate that separates an incident light ray in a fourth direction that forms an angle of 90° to the third direction on the light-receiving surface,
   wherein the following conditional expression is satisfied:

$$1.43 \leq b/a < 3,$$

where a represents a separation width of an incident light ray in each of the first birefringent plate and the second birefringent plate, and b represents a separation width of an incident light ray in each of the third birefringent plate and the fourth birefringent plate.

6. The optical low pass filter according to claim 5, wherein
   either the third birefringent plate or the fourth birefringent plate is arranged between the first birefringent plate and the second birefringent plate, and
   either the first birefringent plate or the second birefringent plate is arranged between the third birefringent plate and the fourth birefringent plate.

7. The optical low pass filter according to claim 5, wherein
   both of a value of MTF in a direction parallel to orthogonal projection of an optic axis of the third birefringent plate onto the light-receiving surface and a value of MTF in a direction parallel to orthogonal projection of an optic axis of the fourth birefringent plate onto the light-receiving surface are equal to or less than 25% in a range of a frequency not less than a cut-off frequency and not more than 300 lp/mm.

8. The optical low pass filter according to claim 5, wherein the optical low pass filter separates an incident light ray into 16 or more light rays.

9. An image capturing apparatus comprising:
   an optical low pass filter and an image-capturing element that receives a light ray output from the optical low pass filter and performs photoelectric conversion thereto, wherein the optical low pass filter includes:
   a first birefringent plate of which an orthogonal projection of an optic axis onto a light-receiving surface of the image-capturing element is parallel to a long side of the image-capturing element,
   a second birefringent plate of which an orthogonal projection of an optic axis onto the light-receiving surface is parallel to a short side of the image-capturing element,
   a third birefringent plate of which an orthogonal projection of an optic axis onto the light-receiving surface forms an angle of 45° to the short side of the image-capturing element, and
   a fourth birefringent plate of which an orthogonal projection of an optic axis onto the light-receiving surface forms an angle of 90° to the orthogonal projection of the optic axis of the third birefringent plate onto the light-receiving surface, and
   the following conditional expression is satisfied:

$$1.43 \leq b/a < 3,$$

where a represents a separation width of an incident light ray in each of the first birefringent plate and the second birefringent plate, and b represents a separation width of an incident light ray in each of the third birefringent plate and the fourth birefringent plate.

10. The image capturing apparatus according to claim 9, wherein
    the image-capturing element includes a plurality of pixels, and
    the following conditional expression is satisfied:

$$0.309 < (a2+b2)/p2 < 0.797,$$

where p represents a pitch between the plurality of pixels.

11. The image capturing apparatus according to claim 9, wherein
    the image-capturing element includes a color filter of a Bayer array.

12. The image capturing apparatus according to claim 9, wherein
    the image-capturing element includes a plurality of pixels, and
    a pitch between the plurality of pixels is not less than 3 μm and not more than 7 μm.

13. The image capturing apparatus according to claim 9, wherein the optical low pass filter separates an incident light ray into 16 or more light rays.

14. An image capturing unit comprising:
    an optical low pass filter and an image-capturing element that receives a light ray output from the optical low pass filter and performs photoelectric conversion thereto, wherein the optical low pass filter includes:
    a first birefringent plate of which an orthogonal projection of an optic axis onto a light-receiving surface of the image-capturing element is parallel to a long side of the image-capturing element,
    a second birefringent plate of which an orthogonal projection of an optic axis onto the light-receiving surface is parallel to a short side of the image-capturing element,
    a third birefringent plate of which an orthogonal projection of an optic axis onto the light-receiving surface forms an angle of 45° to the short side of the image-capturing element, and
    a fourth birefringent plate of which an orthogonal projection of an optic axis onto the light-receiving surface forms an angle of 90° to the orthogonal projection of the optic axis of the third birefringent plate onto the light-receiving surface, and
    the following conditional expression is satisfied:

$$1.43 \leq b/a < 3,$$

where a represents a separation width of an incident light ray in each of the first birefringent plate and the second birefringent plate, and b represents a separation width of an incident light ray in each of the third birefringent plate and the fourth birefringent plate.

15. The image capturing unit according to claim 14, wherein the image-capturing element includes a plurality of pixels, and the following conditional expression is satisfied:

$$0.309 < (a2+b2)/p2 < 0.797,$$

where p represents a pitch between the plurality of pixels.

16. The image capturing unit according to claim 14, wherein the image-capturing element includes a color filter of a Bayer array.

17. The image capturing unit according to claim 14, wherein the image-capturing element includes a plurality of pixels, and a pitch between the plurality of pixels is not less than 3 μm and not more than 7 μm.

18. The image capturing unit according to claim 14, wherein the optical low pass filter separates an incident light ray into 16 or more light rays.

* * * * *